US011217352B2

(12) United States Patent
Keller et al.

(10) Patent No.: US 11,217,352 B2
(45) Date of Patent: Jan. 4, 2022

(54) METHOD FOR HOUSING NUCLEAR REACTOR MODULES

(71) Applicant: NuScale Power, LLC, Portland, OR (US)

(72) Inventors: Michael Keller, Portland, OR (US); Ross I. Snuggerud, Portland, OR (US)

(73) Assignee: NuScale Power, LLC, Portland, OR (US)

( * ) Notice: Subject to any disclaimer, the term of this patent is extended or adjusted under 35 U.S.C. 154(b) by 6 days.

(21) Appl. No.: 16/599,758

(22) Filed: Oct. 11, 2019

(65) Prior Publication Data

US 2020/0051704 A1   Feb. 13, 2020

Related U.S. Application Data

(62) Division of application No. 15/004,128, filed on Jan. 22, 2016, now Pat. No. 10,497,482.

(51) Int. Cl.
| | | |
|---|---|---|
| *G21C 19/07* | (2006.01) | |
| *G21C 19/18* | (2006.01) | |
| *G21C 1/32* | (2006.01) | |
| *G21C 13/02* | (2006.01) | |
| *G21C 17/10* | (2006.01) | |
| *G21C 19/02* | (2006.01) | |

(Continued)

(52) U.S. Cl.
CPC ............... *G21C 19/18* (2013.01); *G21C 1/08* (2013.01); *G21C 1/32* (2013.01); *G21C 13/02* (2013.01); *G21C 17/10* (2013.01); *G21C 19/02* (2013.01); *G21C 19/20* (2013.01); *G21C 19/32* (2013.01); *G21C 19/07* (2013.01); *Y02E 30/30* (2013.01)

(58) Field of Classification Search
CPC ........ G21C 19/07; G21C 19/18; G21C 19/02; G21C 19/20; G21C 19/32; G21C 1/32; G21C 1/08
See application file for complete search history.

(56) References Cited

U.S. PATENT DOCUMENTS 5,225,150 A * 7/1993 Malandra ............... G21C 11/00
376/263
8,588,360 B2 11/2013 Reyes, Jr.
(Continued)

FOREIGN PATENT DOCUMENTS

WO   2011083005 A1   7/2011

OTHER PUBLICATIONS

Keller, Michael F. "Hybrid Nuclear Power: An Unexpected Small Reactor Approach." Small Modular Reactors Symposium. vol. 54730. 2011. (Year: 2011).*

(Continued)

*Primary Examiner* — Lily C Garner
(74) *Attorney, Agent, or Firm* — Perkins Coie LLP

(57) ABSTRACT

An in-core instrumentation system for a reactor module includes a plurality of in-core instruments connected to a containment vessel and a reactor pressure vessel at least partially located within the containment vessel. A reactor core is housed within a lower head that is removably attached to the reactor pressure vessel, and lower ends of the in-core instruments are located within the reactor core. The in-core instruments are configured such that the lower ends are concurrently removed from the reactor core as a result of removing the lower head from the reactor pressure vessel.

5 Claims, 4 Drawing Sheets

(51) Int. Cl.
    *G21C 19/32*     (2006.01)
    *G21C 1/08*     (2006.01)
    *G21C 19/20*     (2006.01)

(56) References Cited

U.S. PATENT DOCUMENTS

| | | |
|---|---|---|
| 8,824,617 B2 | 9/2014 | Sexton et al. |
| 8,958,519 B2 | 2/2015 | Whitten |
| 9,064,607 B2 | 6/2015 | Harkness |
| 9,082,519 B2 | 7/2015 | Weisel et al. |
| 9,190,178 B2 | 11/2015 | Harkness |
| 9,318,227 B2 | 4/2016 | Harkness |
| 10,014,083 B2 * | 7/2018 | Harkness .............. G21C 19/20 |
| 10,818,403 B2 * | 10/2020 | Kitto .......................... G21C 5/18 |
| 2010/0032938 A1 | 2/2010 | Jensen |
| 2013/0223580 A1 | 8/2013 | Shargots |
| 2013/0272465 A1 | 10/2013 | Shargots |
| 2013/0272467 A1 | 10/2013 | Whitten |
| 2013/0294565 A1 * | 11/2013 | Harkness ............. G21C 11/022 |
| | | 376/268 |
| 2013/0301774 A1 | 11/2013 | Berthold |
| 2013/0301775 A1 | 11/2013 | Shargots |
| 2013/0301776 A1 | 11/2013 | Shargots |
| 2013/0301778 A1 | 11/2013 | Shargots |
| 2013/0301779 A1 | 11/2013 | Shargots |
| 2013/0301784 A1 | 11/2013 | Ales |
| 2013/0301785 A1 | 11/2013 | Shargots |
| 2013/0301786 A1 | 11/2013 | Shargots |
| 2014/0270036 A1 | 9/2014 | Dodd |
| 2014/0301520 A1 | 10/2014 | Dodd |
| 2014/0366354 A1 * | 12/2014 | Snuggerud ............. G21C 17/10 |
| | | 29/402.03 |

OTHER PUBLICATIONS

NuScale Plant Design Overview. NP-ER-0000-1198-NP. ML13266A109. Published Sep. 2013. 31 pages. available online: <https://www.nrc.gov/docs/ML1326/ML13266A109.pdf>. (Year: 2013).*

International Search Report and Written Opinion; PCT/US2016/030004; dated Oct. 28, 2016.

International Preliminary Report on Patentability for PCT/US2016/030004 dated Aug. 2, 2018; 10 pages.

NuScale Plant Design Overview; NP-EP-000-1198-NP; ML13266A109. Published Sep. 2013; 31 pages; available online: https://www.nrc.gov/docs/ML13266A109.pdf (Year 2013).

* cited by examiner

METHOD FOR HOUSING NUCLEAR REACTOR MODULES

STATEMENT OF RELATED MATTER

This application is a divisional application of U.S. patent application Ser. No. 15/004,128, filed Jan. 22, 2016, which is herein incorporated by reference in its entirety.

GOVERNMENT INTEREST

This invention was made with Government support under Contract No. DE-NE0000633 awarded by the Department of Energy. The Government has certain rights in this invention.

BACKGROUND

In known pressurized water reactors (PWR) and boiling water reactors (BWR), a reactor core may contain a large number of fuel rods that are several meters in height. The reactor core may be surrounded by water contained within a reactor vessel. Additionally, the reactor may contain in-core instrumentation including a number of instrument assemblies located in the reactor core.

During maintenance or refueling operations, in which some or all of the fuel rods in the reactor core may be inspected or replaced, respectively, the reactor vessel must be at least partially disassembled or removed in order to gain access to the reactor core. Prior to disassembling the reactor vessel, the in-core instrumentation may be disconnected and physically removed from the reactor core by opening the reactor vessel penetrations and pulling the in-core instrumentation out of the reactor core. However, in order to remove the in-core instrumentation, an operator and/or tool is typically introduced into the containment vessel in order to access the in-core instrumentation. For example, the containment structure may comprise a man-way that is large enough for an operator to enter a containment region located above the reactor pressure vessel.

Work conditions and precautionary measures may be established to allow operators to position themselves on top of the reactor pressure vessel head to withdraw the in-core instruments. To withdraw an instrument, the operator may loosen a Swagelok fitting for each in-core instrument and physically grasp the external end of the in-core instrument, which may comprise a forty to eighty foot long tube or cable. The operator then pulls about fifteen feet of the in-core instrument through the reactor pressure vessel such that the lower end of the in-core instrument is withdrawn from the reactor core.

Withdrawing the in-core instrumentation via known refueling operations may therefore not only require providing access to the inside of containment, but the refueling tool or operator may also need to be placed in close physical proximity to the reactor core in order to loosen or open the Swagelok fitting located on top of the reactor pressure vessel. Accordingly, two of the primary means of reducing potential radiation exposure, namely providing shielding from and maintaining distance to a radioactive source, may be compromised in known refueling operations. Alternatively, if the in-core instrumentation and reactor core are first allowed to cool down and/or become less radioactive before the operator or tool is used, then a significant amount of time may transpire in which the reactor module is taken off-line and is unable to generate electricity.

This application addresses these and other problems.

SUMMARY

An in-core instrumentation system for a reactor module is disclosed herein. The in-core instrumentation system may comprise a plurality of in-core instruments connected to a containment vessel and a reactor pressure vessel at least partially located within the containment vessel. A reactor core may be housed within a lower head that is removably attached to the reactor pressure vessel, and lower ends of the in-core instruments may be located within the reactor core. The in-core instruments are configured such that the lower ends may be concurrently removed from the reactor core as a result of removing the lower head from the reactor pressure vessel.

A method for withdrawing in-core instrumentation from a reactor module is disclosed herein. The method may comprise initiating a shut-down procedure for a reactor core located within a reactor pressure vessel. A sealed reactor module may be transported to a refueling pool. The sealed reactor module may comprise the reactor pressure vessel housed within a containment vessel, and in-core instrumentation may be at least partially located within the reactor core while the sealed reactor module is being transported. A lower containment head of the containment vessel may be removed in the refueling pool. Additionally, a lower head of the reactor pressure vessel may be removed in the refueling pool. In response to removing the lower head from the reactor pressure vessel, the method may comprise withdrawing the in-core instrumentation from the reactor core.

A system for withdrawing in-core instrumentation from a reactor module is disclosed herein. The system may comprise means for performing a method similar to that described above.

BRIEF DESCRIPTION OF DRAWINGS

FIG. 5 illustrates a partial view of a nuclear reactor building comprising equipment for assembling and/or disassembling a reactor module.

FIG. 6 illustrates a nuclear power facility 600 comprising a plurality of reactor modules.

FIG. 7 illustrates an example nuclear reactor module with at least a portion of the in-core instrumentation withdrawn into the containment vessel.

FIG. 8 illustrates an example an in-core instrumentation system for a nuclear reactor.

FIG. 9 illustrates an example system associated with withdrawing and/or inserting in-core instrumentation.

FIG. 10 illustrates an example refueling process of a nuclear reactor module.

DETAILED DESCRIPTION

Various examples disclosed and/or referred to herein may be operated consistent with, or in conjunction with, one or more features found in U.S. Pat. No. 8,588,360, entitled Evacuated Containment Vessel for a Nuclear Reactor, U.S. Pat. No. 8,687,759, entitled Internal Dry Containment Vessel for a Nuclear Reactor, U.S. patent application Ser. No. 14/814,904, entitled Control Rod Position Indicator, and U.S. patent application Ser. No. 14/923,277, entitled Passive Cooling to Cold Shut-Down, the contents of which are incorporated by reference herein.

Figure 1:
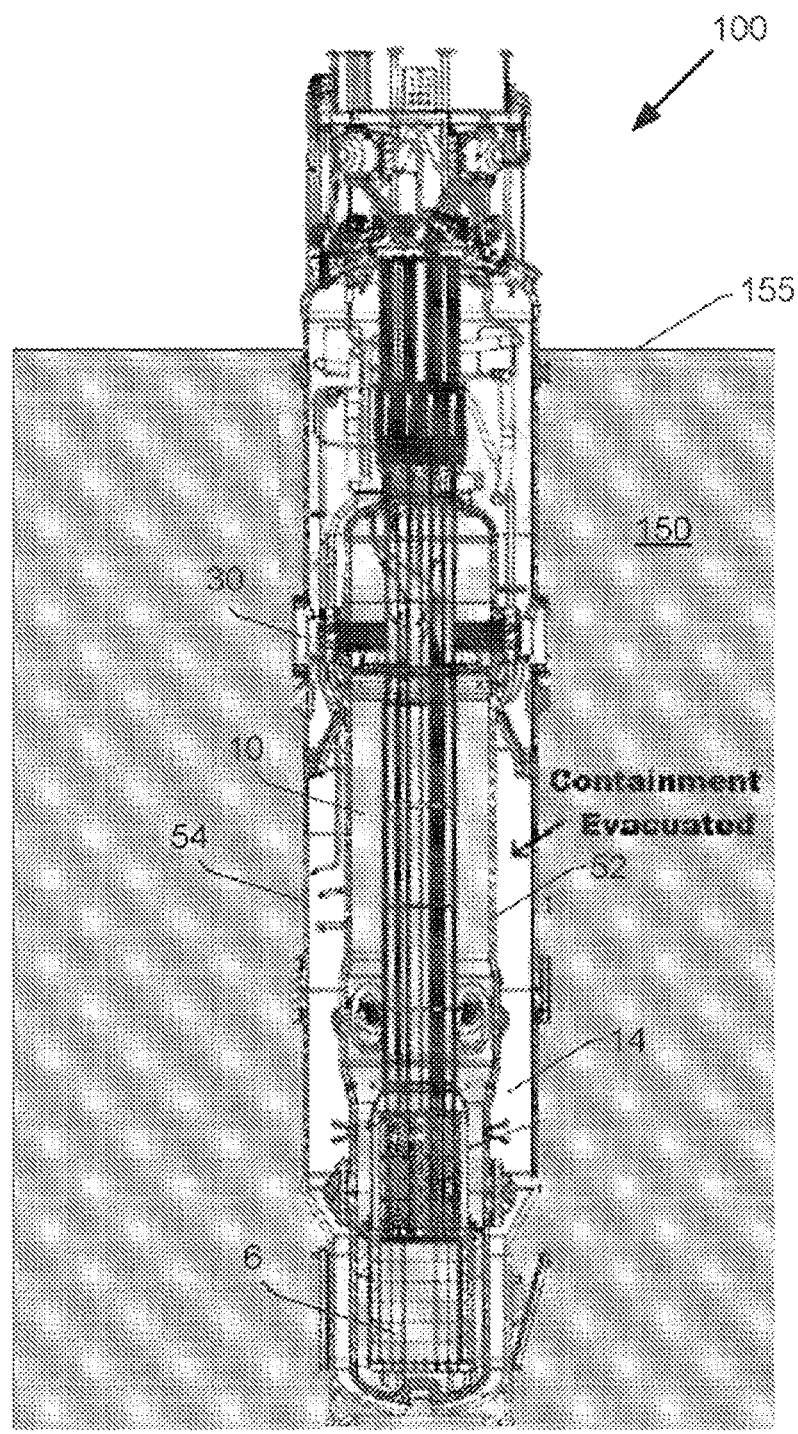
FIG. 1 illustrates an example nuclear reactor module with a dry and/or evacuated containment region.

FIG. 1 illustrates an example nuclear reactor module 100 with a dry and/or evacuated containment region 14. The nuclear reactor module 100 may comprise a reactor core 6 surrounded by a reactor pressure vessel 52. Primary coolant 10 in the reactor pressure vessel 52 surrounds the reactor core 6.

Reactor pressure vessel 52 may be surrounded by a containment vessel 54. In some examples, containment vessel 54 may be located in a reactor pool 150. The reactor pool 150 may contain borated water stored below ground level. Containment vessel 54 may be at least partially submerged in the reactor pool 150. In some examples, at least a portion of the upper head of containment vessel 54 may be located above a surface 155 of the reactor pool 150 in order to keep any electrical connections and/or penetrations through the upper head dry. Additionally, containment vessel 54 may be configured to prohibit the release of any primary coolant 10 associated with reactor pressure vessel 52 to escape outside of containment vessel 54 into the reactor pool 150 and/or into the surrounding environment.

Containment vessel 54 may be approximately cylindrical in shape. In some examples, containment vessel 54 may have one or more ellipsoidal, domed, or spherical ends, forming a capsule shaped containment. Containment vessel 54 may be welded or otherwise sealed to the environment, such that liquids and/or gases are not allowed to escape from, or enter into, containment vessel 54 during normal operation of reactor module 100. In various examples, reactor pressure vessel 52 and/or containment vessel 54 may be bottom supported, top supported, supported about its center, or any combination thereof.

In some examples and/or modes of operation, an inner surface of reactor pressure vessel 52 may be exposed to a wet environment comprising the primary coolant 10 and/or vapor, and an outer surface of reactor pressure vessel 52 may be exposed to a substantially dry environment. The reactor pressure vessel 52 may comprise and/or be made of stainless steel, carbon steel, other types of materials or composites, or any combination thereof.

The containment region formed within containment vessel 54 may substantially surround the reactor pressure vessel 52. Containment region 14 may comprise a dry, voided, evacuated, and/or gaseous environment in some examples and/or modes of operation. Containment region 14 may comprise an amount of air, a noble gas such as Argon, other types of gases, or any combination thereof. Additionally, the surfaces of one or both of reactor pressure vessel 52 and containment vessel 54 that bound containment region 14 may be exposed to water during certain modes of operation such as refueling, shutdown, or transport within the reactor pool 150.

Containment region 14 may be maintained at or below atmospheric pressure, including a partial vacuum of approximately 300 mmHG absolute (5.8 psia) or less. In some examples, containment region 14 may be maintained at approximately 50 mmHG absolute (1 psia). In still other examples, containment region 14 may be maintained at a substantially complete vacuum. Any gas or gasses in containment vessel 54 may be evacuated and/or removed prior to operation of reactor module 100. During normal operation of reactor module 100, containment region 14 may be kept dry and/or evacuated of any water or liquid. Similarly, containment region 14 may be kept at least partially evacuated of any air or gases.

A heat exchanger may be configured to circulate feedwater and/or steam in a secondary cooling system in order to generate electricity. In some examples, the feedwater passes through the heat exchanger and may become super-heated steam. The feedwater and/or steam in the secondary cooling system are kept isolated from the primary coolant 10 in the reactor pressure vessel 52, such that they are not allowed to mix or come into direct (e.g., fluid) contact with each other.

The heat exchanger and/or associated piping of the secondary cooling system may be configured to penetrate through reactor pressure vessel 52 at one or more plenum 30. Additionally, the secondary piping may be routed to the upper region of containment above the level of the reactor pool 150, where the piping penetrates through containment vessel 54. By exiting containment above the reactor pool 150, the high temperature steam and feedwater lines do not loose heat to the reactor pool water 150.

Figure 2:
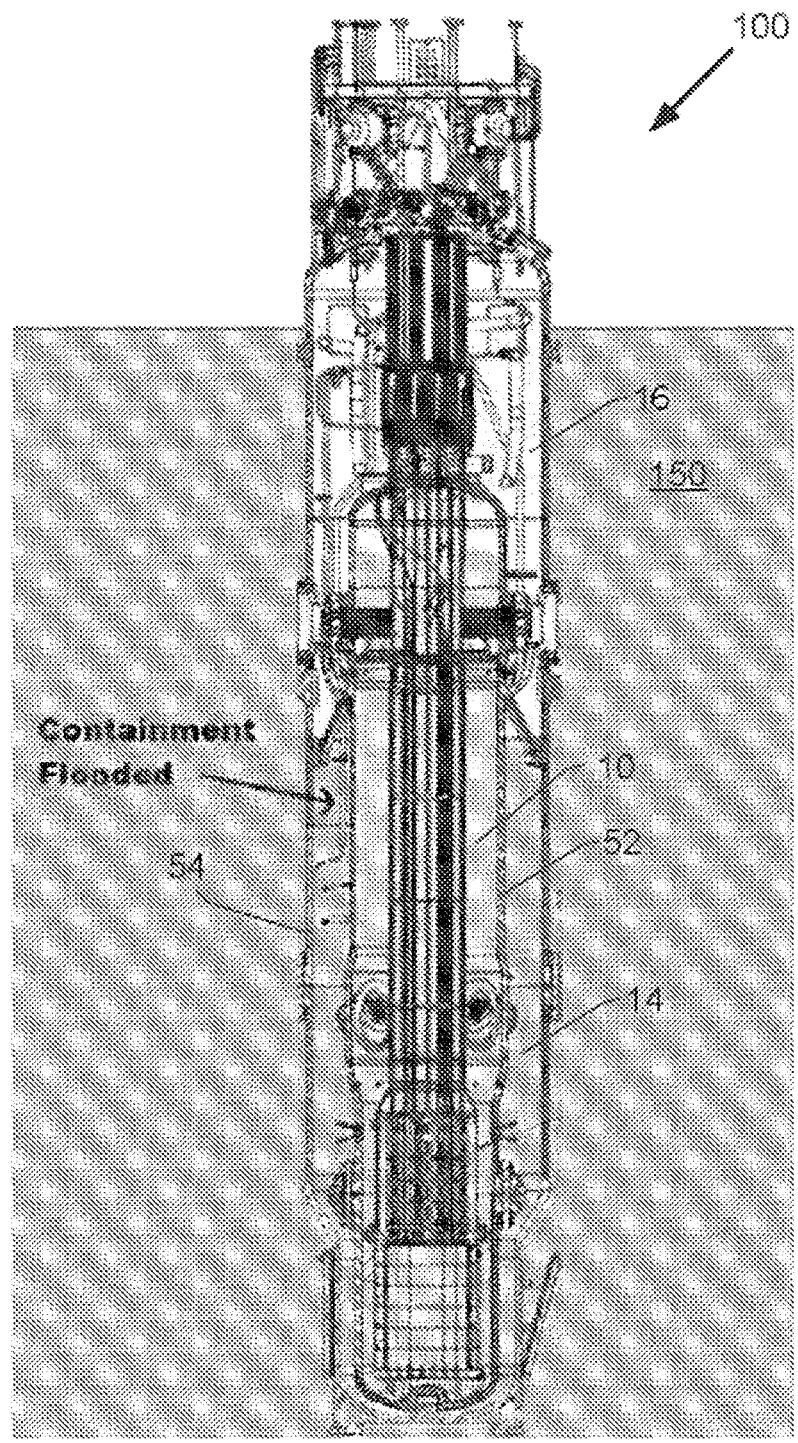
FIG. 2 illustrates the example nuclear reactor module of FIG. 1, with a flooded or at least partially flooded containment region.

FIG. 2 illustrates the example nuclear reactor module 100 of FIG. 1, with a flooded or at least partially flooded containment region 14. During a normal, non-emergency shutdown, one or more steam generators may be configured to release steam and cool down the reactor module 100 from normal operating temperatures down to about 250° F. (121° C.). However, as the process of releasing steam may become somewhat ineffective at 250° F., the temperature of the reactor module may become essentially static or fixed the closer that it gets to the boiling temperature of the secondary coolant.

The cool-down process may be augmented by at least partially flooding the containment region 14 of the example reactor module 100. In some examples, the containment region 14 may be flooded with borated water from the reactor pool 150 until the level of the water is at or above the height of a pressurizer baffle plate located within the reactor pressure vessel 52. During the cool-down process, water that enters containment region 14 is kept outside of reactor pressure vessel 52 and, similarly, all of the primary coolant 10 is kept within reactor pressure vessel 52.

The upper head of the reactor pressure vessel 52 may be kept above the level of the water to avoid any connections that may pass through the upper head from being submerged in or otherwise exposed to water. In some examples, the predetermined level of the water within the containment region 14 may be associated with flooding the containment region 14 so that the majority of the reactor pressure vessel 52 is surrounded by the water. In other examples, the entire reactor pressure vessel 52 may be surrounded or submerged in the water that floods the containment region 14.

The containment region 14 may be at least partially filled with water to initiate a passive cool-down process to a cold shutdown state, e.g., a shutdown state associated with primary coolant temperatures of less than 200° F. (93° C.). Once the containment region 14 is flooded above a predetermined level, no further action may be required, and the passive cool-down of the operating temperature to less than 200° F. may occur primarily as a function of natural circulation of the primary coolant 10 within the reactor pressure vessel 52, the shutdown reactor's decay heat, the transfer of heat from the primary coolant 10 to the water in the containment region 14, and the temperature of the reactor pool 150.

During the cool-down process, an upper portion 16 of the containment region 14 may remain substantially dry and/or above the surface of the water contained therein. The pressure within upper portion 16 may be equalized to approximate atmospheric conditions as the reactor module reaches the shutdown state. A manway and/or release valve may be provided in the upper portion 16 of the containment region 14 to vent gases to atmosphere. In some examples, the manway and/or one or more valves may be configured to provide access to the containment region 14 for purposes of adding water. The pressure in the upper portion 16 may be controlled in order to maintain the level of water within the containment region 14 to a predetermined height within containment vessel 54.

In examples where the reactor module 100 is configured to operate without any conventional thermal insulation being applied to the exterior of the reactor pressure vessel 52, heat may be readily transferred through the reactor vessel wall to the surrounding water in the containment region 14 during the cool-down process.

Figure 3:
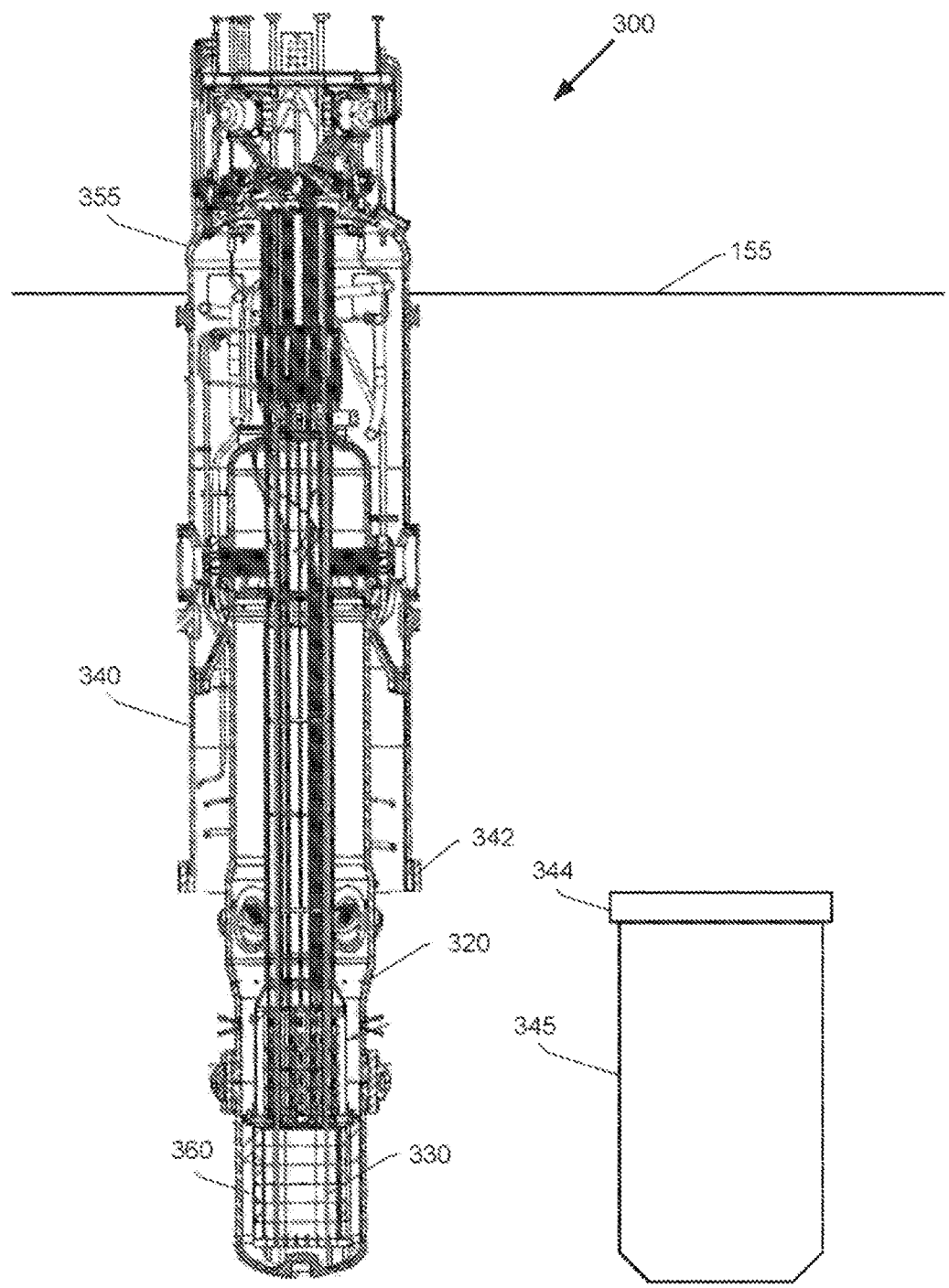
FIG. 3 illustrates an example nuclear reactor module comprising a partially disassembled containment vessel.

FIG. 3 illustrates an example nuclear reactor module 300 comprising a reactor pressure vessel 320 housed within a partially disassembled containment vessel 340. A lower containment head 345 is shown removed from containment vessel 340. The removal of lower containment head 345 may be performed during refueling, maintenance, inspection, or other non-operational processes of reactor module 300.

Containment vessel 340 may be removably attached to lower containment head 345 via an upper containment flange 342 and a lower containment flange 344. For example, a plurality of bolts may pass through and/or connect upper containment flange 342 to lower containment flange 344. Similarly, the bolts may be loosened and/or removed prior to removing lower containment head 345 from containment vessel 340.

In-core instrumentation 330 is shown as being at least partially inserted into a reactor core 360 contained within reactor pressure vessel 320. In some examples, in-core instrumentation 330 may comprise twelve or more in-core instrument assemblies. Each in-core assembly may comprise a monitor, a sensor, a measuring device, a detector, other types of instruments, or any combination thereof. Additionally, the in-core assemblies may be attached to a number of wires or cables. The wires or cables associated with in-core instrumentation 330 may extend from an upper containment head 355 of containment vessel 340 down to reactor core 360. Upper containment head 355 may comprise one or more penetrations that are configured to allow in-core instrumentation 330 to be electrically coupled to wiring located outside of containment vessel 340.

Lower containment head 345 may remain completely submerged below the surface 155 of a reactor pool, such as reactor pool 150 (FIG. 1) during the disassembly of containment vessel 340. While reactor pressure vessel 320 may remain intact and/or sealed during the disassembly of containment vessel 340, at least the lower portion of reactor pressure vessel 320 may also be surrounded by the reactor pool.

Figure 4:
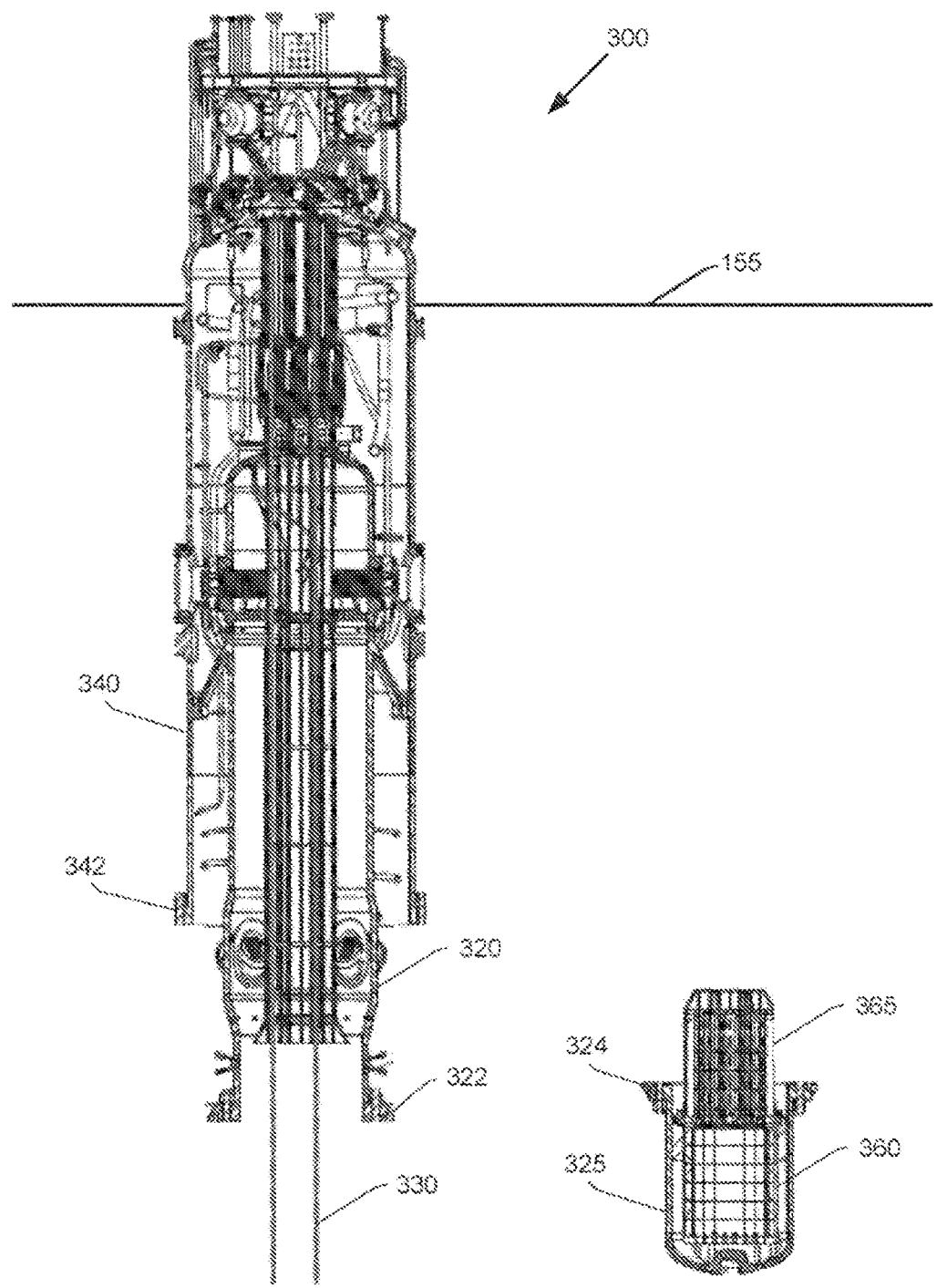
FIG. 4 illustrates the example nuclear reactor module of FIG. 3 comprising a partially disassembled reactor pressure vessel.

FIG. 4 illustrates the example nuclear reactor module 300 of FIG. 3 comprising a partially disassembled reactor pressure vessel 320. A lower vessel head 325 is shown having been removed from the reactor pressure vessel 320, such as during refueling, maintenance, inspection, or other non-operational processes of reactor module 300.

Reactor pressure vessel 320 may be removably attached to lower vessel head 325 via an upper vessel flange 322 and a lower vessel flange 324. For example, a plurality of bolts may pass through and/or connect upper vessel flange 322 to lower vessel flange 324. Similarly, the bolts may be loosened and/or removed prior to removing lower vessel head 325 from reactor pressure vessel 320.

As a result of removing lower vessel head 325 from reactor pressure vessel 320, the in-core instrumentation 330 may be effectively withdrawn from the reactor core 360 as the lower vessel head 325 is being separated. Where in-core instrumentation 330 comprises multiple in-core instrument assemblies, all of the in-core instrument assemblies may be withdrawn from reactor core 360 substantially at the same time. In-core instrumentation 330 is shown as being at least partially protruding from or extending below the partially disassembled reactor pressure vessel 320 following the removal of lower vessel head 325.

During a non-operational process, such as refueling, a visual inspection of the exterior of the reactor pressure vessel 320 and containment vessel 340 may be performed. Following the removal of lower containment head 345 and/or lower vessel head 325, remote inspection of the flanges and internal surfaces of the vessels may be performed while the vessels and/or lower heads are supported in one or more stands. In some examples, the remote inspections may comprise ultrasonic testing of key welds and full visual inspection of the internal surfaces. Additionally, some or all of the inspection may occur underneath the surface 155 of a reactor pool.

In-core instrumentation 330 may remain connected to the top of containment vessel 340, and sealed by one or more pressurizer penetrations, as the reactor flanges are separated and lower vessel head 325 is removed from reactor pressure vessel 320. Each instrument assembly associated with in-core instrumentation 330 may be configured to slide out of their respective guide tubes in response to separating lower vessel head 325 from reactor pressure vessel 320.

The withdrawal of in-core instrumentation 330 from the reactor core 360 and guide tubes may be accomplished without breaking the water-tight seal formed between containment vessel 340 and the surrounding pool of water. For example, the upper head of containment vessel 340 located at least partially above the surface 155 of the reactor pool may remain completely sealed to the surrounding environment during the disassembly of both the reactor pressure vessel 320 and the containment vessel 340, such that withdrawal of in-core instrumentation 330 from the guide tubes may be accomplished without providing any external access through the upper head of containment vessel 340.

The guide tubes may be located in reactor core 360 and in some examples may extend up into a lower riser assembly 365 located above reactor core 360. In some examples, the in-core instrumentation 330 may be configured such that the lower ends are concurrently removed from both the lower riser assembly 365 and the reactor core 360 as a result of removing the lower head from the reactor pressure vessel 320. When in-core instrumentation 330 is clear of lower riser assembly 365, containment vessel 340 may be moved to a maintenance facility. On the other hand, lower vessel head 325 may be moved to a refueling bay, or remain behind without being moved, such that multiple operations may be performed on separated components of reactor module 300.

During disassembly and transport of reactor module 300 and/or containment vessel 340, the lower ends of in-core instrumentation 330 may remain submerged in and surrounded by the reactor pool water at all times. The reactor pool water may operate to both reduce the temperature of in-core instrumentation 330 and provide a shield for any radiation which may be emitted from the lower ends.

FIG. 5 illustrates a partial view of a nuclear reactor building 500 comprising equipment for assembling and/or disassembling a reactor module, such as reactor module 300 (FIG. 3). The equipment may comprise one or more stands located at the bottom of a containment pool or refueling bay. A first stand 510 may be configured to assemble and/or disassemble a containment vessel, such as containment vessel 340 (FIG. 3), after the reactor module has been shut down. During disassembly of the reactor module, a lower containment head 545 of the containment vessel may be placed in first stand 510. For example, a crane may be configured to transport the entire reactor module from a reactor bay and then lower the reactor module into first stand 510.

After being placed in first stand 510, a containment flange associated with the lower containment head 545 may be de-tensioned by a containment tool 550, such as by loosening and/or removing a number of bolts. With lower containment head 545 decoupled from the containment vessel, the reactor module may be lifted from first stand 510 by the crane and placed in a second stand 520. With lower containment head 545 remaining behind in first stand 510, a lower vessel head 525 associated with a reactor pressure vessel may be placed in second stand 520.

After being placed in second stand 520, a reactor vessel flange associated with lower vessel head 525 may be de-tensioned by a reactor pressure vessel tool 560, such as by loosening and/or removing a number of bolts. One or both of reactor pressure vessel tool 560 and containment tool 550 may be operated remotely. With lower vessel head 525 decoupled from the reactor pressure vessel, the reactor module may be lifted from second stand 520 by the crane and moved to a maintenance facility. Additionally, the lower vessel head 525 may be moved separately from the reactor module, or lower vessel head 525 may be refueled and/or maintenance work performed while being held in second stand 520.

In some examples, the refueling bay containing reactor pressure vessel tool 560 and containment tool 550 may comprise a rectangular area approximately sixty feet long by thirty feet wide. The floor of the refueling bay may be at elevation twenty feet, and covered by seventy five feet of water. In some examples, the refueling bay floor may be approximately six feet below the bottom of pool for the balance of the facility.

An inspection of the inner and outer surfaces of lower vessel head 525 and lower containment vessel 545 may be performed following the partial disassembly of the reactor module. Additionally, the exposed core support assembly and lower riser assembly may also be inspected. The inspection of the vessel features may include visual, volumetric, ultrasonic, and/or other inspection techniques. The inspections may be performed during the refueling process of the reactor module.

A visual examination may be conducted to detect discontinuities and imperfections on the surface of components, including such conditions as cracks, wear, corrosion, or erosion. Additionally, the visual examination may be conducted to determine the general mechanical and structural condition of components and their supports by verifying parameters such as clearances, settings, and physical displacements, and to detect discontinuities and imperfections, such as loss of integrity at bolted or welded connections, loose or missing parts, debris, corrosion, wear, or erosion.

A volumetric examination may indicate the presence of discontinuities throughout the volume of material and may be conducted from either the inside or outside surface of a component. The volumetric examination may comprise remotely deployed ultrasonic devices for examination of code identified vessel welds.

A lower vessel inspection tree (LVIT) may comprise operating control console and cabling used to perform visual and ultrasonic testing of surfaces and features within lower vessel head 525 and lower containment vessel 545. An LVIT may be installed at or near the lower vessel sections in the bottom of the refueling pool. One or more LVITs may be used to locate, monitor, and report the position of inspection elements, and to acquire data that is transmitted back to the control console. The installation of the LVIT on the lower vessels may be performed remotely using a reactor building crane with the wet hoist attached. Additionally, in-pool cameras may be used by the crane operator to control crane motion and load placement.

FIG. 6 illustrates a nuclear power building 600 comprising a plurality of reactor modules, such as a reactor module 610 and an additional reactor module 620. Nuclear power building 600 is shown as including twelve reactor modules by way of example only, and fewer or more reactor modules per nuclear power building are contemplated herein.

Nuclear power building 600 may comprise an overhead crane 655 supported by a rail 695 and configured to move or transport the plurality of reactor modules. In the illustrated example, reactor module 610 has been removed from a reactor bay 630 and is in the process of being transported through a shared reactor building passageway 650. The passageway 650 may be fluidly connected to each of the reactor bays, such as reactor bay 630, allowing reactor module 610 to be transported by crane 655 while being at least partially submerged under water.

Passageway 650 may fluidly connect reactor bay 630 to a spent fuel pool 680 and/or to a dry dock 690. Additionally, the passageway 650 may fluidly connect reactor bay 630 to a refueling bay 665 containing a containment vessel stand 660 and a reactor pressure vessel stand 670. In some examples, containment vessel stand 660 and reactor pressure vessel stand 670 may be configured similarly as first stand 510 and second stand 520 illustrated in FIG. 5, and may include a containment assembly/disassembly tool and a reactor pressure vessel assembly/disassembly tool, respectively.

By including a plurality of reactor modules, reactor module 610 may be taken off-line for purposes of refueling and/or maintenance while the remaining reactor modules continue to operate and produce power. In a nuclear power facility comprising twelve reactor modules, where each reactor module has a designed fuel life of two years, a different reactor module may be refueled every two months as part of a continuous refueling cycle. For reactor modules having longer designed fuel lives, the reactor modules may be refueled less frequently.

An LVIT 640 may be configured to enter nuclear power building 600 through an opening or door for purposes of conducting visual and/or ultrasonic inspections of the reactor modules. In some examples, LVIT 640 may be moved within nuclear power building 600 by crane 655. After the LVIT 640 has been placed by or near the vessel to be inspected, crane 655 may be disengaged from the LVIT 640, freeing crane 655 to perform other operations in support of the refueling outage while the inspections are conducted. Once the inspection is completed, crane 655 may be used to remove the LVIT 640 from the vessel that was inspected.

LVIT 640 may be configured to inspect one or both of a reactor pressure vessel and a containment vessel. In some examples, two or more LVITs may operate concurrently to inspect the reactor pressure vessel and the containment vessel, providing the ability to perform multiple inspections at the same time. Providing duplicate and/or redundant inspection devices may reduce the amount of equipment necessary to complete the reactor module inspections, allow concurrent inspections of multiple reactor modules, and/or provide the ability to use either inspection device as a spare in the event of equipment failure.

FIG. 7 illustrates an example nuclear reactor module 700 with at least a portion of the in-core instrumentation 730 withdrawn into a containment vessel 740. A lower containment head has been removed from containment vessel 740, such that a reactor pressure vessel 720 at least partially housed within containment vessel 740 may be accessed below a lower containment flange 742. Similarly, a lower vessel head has been removed from reactor pressure vessel 720 in the illustrated example.

With both of the lower heads removed from reactor pressure vessel 720 and containment vessel 740, a lower reactor pressure vessel flange 722 may be located beneath a surface 755 of a pool of water. In other examples, both the lower reactor pressure vessel flange 722 and the lower containment flange 742 may be located beneath the surface 755. The surface 755 associated with the pool of water may be located within a dry dock, such as dry dock 690 (FIG. 6). In some examples, the level of surface 755 may be adjusted when the reactor module 700 is located at the dry dock in order to provide access to one or more components, such as a steam generator. In still other examples, the position of reactor module 700 may be lowered or raised to adjust the relative level of surface 755.

In-core instrumentation 730 may be electrically coupled to an upper containment head 745 of containment vessel 740. A connection device 780 may provide a sealed penetration through upper containment head 745. External wiring 785 may be operably coupled to in-core instrumentation 730 via the connection device 780. In some examples, connection device 780 may comprise a two-part connector configured to attach to both in-core instrumentation 730 and external wiring 785. Additionally, in-core instrumentation 730 may be routed through a sealed penetration 760 of an upper head 725 of reactor pressurizer vessel 720.

The withdrawal of in-core instrumentation 730 through sealed penetration 760 and into containment vessel 740 may operate to withdraw a lower end 735 of in-core instrumentation 730 into reactor pressure vessel 720. The withdrawal process may be initiated after the temperature of the reactor coolant and/or the reactor pressure vessel have decreased to a threshold cooling temperature, e.g., by the transfer of heat to the surrounding pool water. While the reactor coolant and/or the reactor pressure vessel are being cooled down, refueling and other maintenance operations may be performed on other components, such as the reactor core which has been separated from reactor pressure vessel 720.

In some examples, such as where in-core instrumentation 730 comprises a plurality of in-core instrument assemblies, all of the lower ends 735 of the instrument assemblies may be withdrawn into reactor pressure vessel 720 at the same time. In other examples, each of the instrument assemblies may be separately withdrawn into reactor pressure vessel 720.

An access portal 770 may be provided in upper containment head 745. Access portal 770 may be configured to provide access for an operator and/or a tool to enter containment vessel 740 for purposes of withdrawing in-core instrumentation 730. For example, the tool may comprise a pole and grasping device configured to attach to a portion of in-core instrumentation 730 located near or some distance above sealed penetration 760, in order to pull the portion of in-core instrumentation 730 into upper containment head 745. In other examples, the upper portion of in-core instrumentation 730 may be pulled up through a containment penetration provided at or near connection device 780, so that the upper portion of in-core instrumentation 730 may be pulled outside of containment vessel 740 without providing access through access portal 770.

Sealed penetration 760 may comprise a Swagelok fitting. The fitting may be configured to retain the position of in-core instrumentation 730 at a fixed position. In some examples, sealed penetration 760 may be loosened to allow the withdrawal of the upper portion of in-core instrumentation 730 into containment vessel 740. Once the in-core instrumentation 730 has been withdrawn, sealed penetration 760 may be tightened to again fix the position of lower ends 735 within reactor pressure vessel 725. A Swagelok tool may be inserted into the upper containment head 745 of containment vessel 740 through access portal 770. In other examples, the sealed penetration 760 may be automatically loosened and tightened during different stages of the disassembly operation, without requiring access into the containment vessel 740.

FIG. 8 illustrates an example an in-core instrumentation system 800 for a nuclear reactor. After performing a refueling operation and/or other maintenance activity, the reactor module may be prepared for reassembly of the reactor pressure vessel and containment vessel so that the reactor module may be placed back on line. For example, a lower head containing a reactor core with new fuel rods may be reattached to a reactor pressure vessel 820. Following the reattachment of the lower head to reactor pressure vessel 820, in-core instrumentation 830 may be reinserted into the replenished reactor core and/or into the corresponding guide tubes.

In-core instrumentation 830 may comprise relatively flexible cabling suspended from a containment vessel connection 880. The instrumentation cabling may be routed through relatively rigid instrumentation sheathing 855. An upper end of instrumentation sheathing 855 may be supported by a bracket 850. Bracket 850 may be configured to stabilize the upper ends of sheathing 855 and, in some examples, may provide a means of simultaneously withdrawing in-core instrumentation 830 through an instrumentation position control device 860. Instrumentation position control device 860 may provide for a sealed penetration through an upper head of reactor vessel 820.

Similar to the example nuclear reactor module 700 illustrated in FIG. 7, an upper portion of in-core instrumentation 830 may have been withdrawn into the containment vessel. The withdrawal of in-core instrumentation 830 may be accomplished by raising bracket 850. In some examples, the insertion of in-core instrumentation 830 into the reactor core and/or guide tubes may be accomplished by lowering bracket 850. In some examples, bracket 850 and/or instrumentation sheathing 855 may provide a guide by which in-core instrumentation 830 may be threaded or inserted down into the reactor core.

Instrumentation sheathing 855 may comprise a threaded portion 835. The threaded portion 835 may be substantially the same length as the length of in-core instrumentation 830 that is withdrawn from reactor pressure vessel 820 into the containment vessel. Instrumentation position control device 860 may comprise one or more threaded gears and/or motors that may be configured to raise or lower in-core instrumentation 830 via a threaded engagement with the threaded portion 835 of instrumentation sheathing 855. Instrumentation position control device 860 may be remotely actuated to control the position of in-core instrumentation 830. Additionally, instrumentation position control device 860 may be remotely sealed or unsealed.

FIG. 9 illustrates an example system 900 associated with withdrawing and/or inserting in-core instrumentation into a reactor core. A plurality of in-core instruments 930 may be connected to a containment vessel 940. In some examples, in-core instruments 930 may be suspended from an upper head of the containment vessel 940 at instrument connection 980. A reactor pressure vessel 920 may be at least partially located within the containment vessel 940.

During full power operation of the reactor module, reactor pressure vessel 920 may be entirely housed in a sealed containment region within containment vessel 940. During the initial stages of a refueling operation, in which a lower head of containment vessel 940 may be removed in order to access the internal components of the reactor module including the reactor core 990, a portion of reactor pressure vessel 920 may be partially located outside of containment vessel 940. For example, a lower head of the reactor pressure vessel 920 may be exposed to a surrounding pool of water below the containment vessel 940.

The reactor core 990 may be housed within a lower vessel head that is removably attached to the reactor pressure vessel 920. With the lower vessel head attached to the reactor pressure vessel 920, the lower ends of in-core instruments 930 may be located within the reactor core 990 which is housed in the lower vessel head of reactor pressure vessel 920. Additionally, in-core instruments 930 may pass through a vessel penetration 960 located in an upper vessel head of reactor pressure vessel 920.

The in-core instruments 930 may be configured such that the lower ends are concurrently removed from the reactor core 990 as a result of removing the lower vessel head from the reactor pressure vessel 920. The lower ends of in-core instruments 930 may be removed from the reactor core 990 without unsealing the vessel penetration 960. Additionally, in examples in which the upper vessel head of the containment vessel 940 is environmentally sealed, the lower ends of in-core instruments 930 may be removed from the reactor core 930 without unsealing the upper vessel head of containment vessel 940.

The containment vessel 940 may be at least partially submerged in a surrounding pool of water. As a result of removing the lower vessel head from the reactor pressure vessel 920, the lower ends of the in-core instruments 930 may be exposed to the pool of water. In examples where the lower vessel head is removably attached to the reactor pressure vessel 920 at a vessel flange, the exposed lower ends of the in-core instruments 930 may extend several meters below the vessel flange in the pool of water.

The reactor module may be transported to a maintenance bay and/r refueling bay while the exposed lower ends of the in-core instruments 930 extend below the vessel flange into the pool of water. Additionally, an upper portion of the in-core instruments 930 may be withdrawn from the reactor pressure vessel 920 into the containment vessel 940 while the reactor pressure flange remains submerged in the pool of water.

A reactor controller 970 may be configured to monitor the temperature of the in-core instruments 930. Reactor controller 970 may comprise a sensor, a gauge, a thermometer, a thermocouple, other means of monitoring temperature, or any combination thereof. Additionally, reactor controller 970 may be configured to monitor, measure, detect, read, sense, estimate, or otherwise determine the temperature associated with the reactor pressure vessel 920.

Reactor controller 970 may be configured to raise and/or lower in-core instruments 930 in response to determining that the temperature associated with the in-core instruments 930 has reached a threshold cooling temperature.

FIG. 10 illustrates an example process 1000 of refueling a nuclear reactor module. The reactor module may comprise a reactor vessel housed within a containment vessel. The containment vessel may at least partially surround the reactor pressure vessel by a containment region. The containment region may be evacuated of liquid and/or air during normal operation of the reactor module. Additionally, the containment vessel may be at least partially submerged in a reactor pool.

At operation 1010, a reactor shut-down or other type of maintenance activity may be initiated. For example, a plurality of control rods may be inserted into the reactor core.

At operation 1020, the sealed reactor module may be transported to a refueling pool. The reactor module may comprise a reactor pressure vessel housed within a containment vessel. In-core instrumentation may be at least partially located within the reactor core while the sealed reactor module is being transported.

At operation 1030, a lower containment head of the containment vessel may be removed in the refueling pool. The lower containment head may be removed by placing the reactor module in a first stand and then loosening a plurality of bolts connecting the lower containment head to the containment vessel. The containment vessel may then be lifted off of the lower containment head while the lower containment head remains fixed in the first stand.

At operation 1040, a lower head of the reactor pressure vessel may be removed in the refueling pool. The lower head of the reactor pressure vessel may be removed by placing the reactor module in a second stand and then loosening a plurality of bolts connecting the lower head of the reactor pressure vessel to the reactor pressure. The reactor pressure vessel may then be removed from the lower head while the lower head remains fixed in the second stand.

The in-core instrumentation may be withdrawn from the reactor core together with, or as a result of removing, the lower vessel head from the reactor pressure vessel. In some examples, the in-core instrumentation is withdrawn from the reactor core after the lower vessel head is disconnected from a reactor pressure vessel flange. The in-core instrumentation may extend below the reactor pressure vessel flange in the refueling pool after the lower vessel head has been removed.

At operation 1050, the temperature of the reactor coolant and/or the reactor pressure vessel may be allowed to cool down. During the cool down period, the reactor core may be separately processed for refueling.

At operation 1060, at least a portion of the in-core instrumentation may be withdrawn from the reactor pressure vessel into the containment vessel after the lower head has been removed from the reactor pressure vessel. Operation 1060 may be performed in a maintenance facility, such as a maintenance bay. The maintenance bay may be fluidly connected to a refueling bay, such as by a shared waterway of a reactor building.

At operation 1070, the reactor core may be refueled. In some examples, the reactor core may be refueled in the refueling bay while the portion of the in-core instrumentation is withdrawn from the reactor pressure vessel. Additionally, the reactor core may be refueled while the in reactor coolant and the reactor pressure vessel are allowed to cool down at operation 1050.

At operation 1080, the lower head of the reactor pressure vessel may be reattached to the reactor module after the reactor core has been refueled.

At operation 1090, the in-core instrumentation may be inserted into the replenished reactor core while returning the portion of the in-core instrumentation from the containment vessel back into the reactor pressure vessel.

At operation 1110, the reactor module, with the in-core instruments having been inserted into the reactor core, may be transported to a reactor bay after the reactor module has been environmentally sealed by reattaching the lower containment head to the containment vessel. In other examples, the insertion of the in-core instrumentation at operation 1090 may occur after transporting the reactor module to the reactor bay at operation 1110.

One or more example systems described herein may comprise various nuclear reactor technologies, and may comprise and/or be used in conjunction with nuclear reactors that employ uranium oxides, uranium hydrides, uranium nitrides, uranium carbides, mixed oxides, and/or other types of fuel. Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium liquid metal reactor, gas cooled reactor, pebble-bed reactor, and/or other types of reactor designs.

Additionally, the examples illustrated herein are not necessarily limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A method for housing nuclear reactor modules within a nuclear reactor building, comprising:
    housing and operating the nuclear reactor modules in different reactor bays of the nuclear reactor building, wherein the nuclear reactor modules each comprise:
        a reactor pressure vessel;
        a lower reactor vessel removably attached to the reactor pressure vessel and configured to house a reactor core;
        a containment vessel encapsulating the reactor pressure vessel; and
        a lower containment head removable attached to the containment vessel and configured to house the lower reactor vessel head; and
    for an individual nuclear reactor module:
        transporting the nuclear reactor module via a crane from a reactor bay to a first location at a refueling bay;
        disconnecting the lower containment head from the containment vessel while supporting the lower containment head at the first location at the refueling bay;
        transporting the containment vessel, the reactor pressure vessel, and the lower reactor vessel head to a second location at the refueling bay; and
        disconnecting the lower reactor vessel head from the reactor pressure while supporting the lower reactor vessel head at the second location at the refueling bay.

2. The method of claim 1, wherein the crane moves on a rail that extends over the reactor bays and the refueling bay.

3. The method of claim 1, wherein for each individual nuclear reactor module, the nuclear reactor module is transported via the crane from the reactor bay to the first location at the refueling bay through a common passageway of the nuclear reactor building.

4. The method of claim 3, further comprising flooding the common passageway so the nuclear reactor module is at least partially submerged in water when transported from the reactor bay to the first location at the refueling bay.

5. The method of claim 1, further comprising, for each individual nuclear reactor module, transporting the containment vessel and the reactor pressure vessel away from the first and second locations while the lower containment head remains supported at the first location of the refueling bay, and the lower reactor vessel head remains supported at the second location of the refueling bay.

* * * * *

UNITED STATES PATENT AND TRADEMARK OFFICE
CERTIFICATE OF CORRECTION

| | | |
|---|---|---|
| PATENT NO. | : 11,217,352 B2 | Page 1 of 1 |
| APPLICATION NO. | : 16/599758 | |
| DATED | : January 4, 2022 | |
| INVENTOR(S) | : Michael Keller et al. | |

It is certified that error appears in the above-identified patent and that said Letters Patent is hereby corrected as shown below:

In the Claims

In Column 14, Line 3, in Claim 1, after "vessel" insert -- head --.

In Column 14, Line 8, in Claim 1, delete "removable" and insert -- removably --.

In Column 14, Line 24, in Claim 1, after "pressure" insert -- vessel --.

Signed and Sealed this
Fifteenth Day of November, 2022

*Katherine Kelly Vidal*

Katherine Kelly Vidal
*Director of the United States Patent and Trademark Office*